Oct. 19, 1954
R. M. WALKER
2,692,367
RESONATOR TEST EQUIPMENT
Filed April 12, 1946
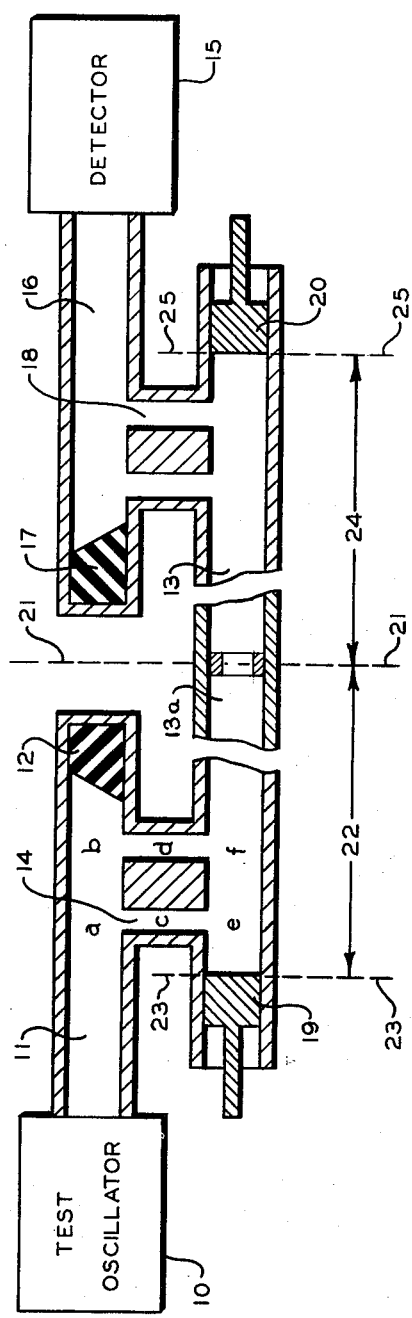
INVENTOR.
RICHARD M. WALKER
BY
*M. C. Hayes*
ATTORNEY Patented Oct. 19, 1954

2,692,367

UNITED STATES PATENT OFFICE 2,692,367

RESONATOR TEST EQUIPMENT

Richard M. Walker, Dorchester, Mass., assignor, by mesne assignments, to the United States of America as represented by the Secretary of the Navy Application April 12, 1946, Serial No. 661,596

4 Claims. (Cl. 324—58)

1

This invention relates to an improvement in resonator test equipment and more particularly to an improvement in resonator test equipment for wave guide discontinuity investigation.

It is well known that the reflection and transmission produced by a discontinuity in a wave guide, for example an iris, a probe, a flange coupling, or a perturbation on the wall of the guide, may be conveniently described in terms of an equivalent network of impedances placed in a transmission line. The values of these impedances are of considerable interest both from a theoretical and a practical standpoint.

The conventional method of investigating discontinuities in wave guides is by the use of the slotted section. Briefly the method involves feeding radio frequency energy through attenuators to a section of wave guide fitted with a detector and a probe capable of traveling along a longitudinal slot in the wave guide. The other end of this slotted section of wave guide is connected to a section fitted with the discontinuity to be investigated and this section in turn is terminated in a movable shorting plunger. The procedure for measurement is to set the shorting plunger at various distances from the discontinuity, and for each distance determine the position of the electric field node by means of the traveling detector and probe. This procedure gives information which is sufficient for calculating the impedances of the equivalent network representing the discontinuity to within a few percent. However, for higher accuracy, the following difficulties are encountered with this method.

(a) There is a low signal-to-noise ratio at the place of measurement, (b) The variation in electrical field intensity is not symmetrical about the electric field node, due to attenuation in the wave guide system. In order to determine the position of the node with any accuracy, one reading on each side of the node has to be taken. Therefore, any dissymmetry gives rise to error, (c) The shorting plunger and the probe are necessarily separated by a large number of wavelengths, so that a slight change in the test oscillator frequency introduces large errors, (d) The test oscillator frequency is affected by the position of the plunger since the loading presented by the wave guide system is dependent upon its length, and (e) The slotted section of wave guide represents a discontinuity itself and this must be taken into account in the calculations for the discontinuity under investigation.

2

To circumvent these difficulties a cavity resonator method has been employed. In this method the discontinuity was incorporated in the cavity resonator and its effect on the dimensions of the cavity resonator for resonance were used to calculate the impedance of the equivalent network representing the discontinuity. Greater accuracy could be obtained with this method for the following reasons:

(a) There is a high signal-to-noise ratio at the place of measurement, since measurements are taken at resonance with the probe near the maximum field intensity, (b) The resonance can be made very sharp by loosely coupling the cavity resonator to the rest of the system, (c) The cavity resonator can be made much shorter than the wave guide system in the slotted section method so that a slight change in the test oscillator frequency introduces smaller errors, and (d) The loading of the test oscillator is constant during all measurements since the cavity resonator is always at resonance for these measurements.

Heretofore, the cavity resonator used comprised, an input plunger through which energy was introduced, a uniform section of wave guide used as a test section adapted to have the discontinuity incorporated therein and equipped with a probe and detector for determining resonance, and a terminal plunger. A cavity was formed by inserting the input plunger at one end of the test section and the terminal plunger at the other end. Thus the cavity was formed by a uniform section of wave guide bounded by a plunger at each end. Among the difficulties encountered with this cavity resonator method are the following: (a) the detecting probe has susceptance itself so that great care has to be taken to reduce this susceptance to a negligible value or a series of measurements has to be taken and calculations made to account for it in the investigation of the discontinuity, (b) the input plunger is very intricate and difficult to construct, (c) even with careful design and construction of the input plunger, the provisions that must be made for inserting energy through it cause it to lower the Q of the cavity resonator and reduce the sharpness of resonance, and (d) the system reflects some reactance into the test oscillator which pulls its frequency from the no load value by a slight amount.

Therefore, it is an object of this invention to provide apparatus for the investigation of wave guide discontinuities.

It is another object of this invention to provide apparatus for utilization in a cavity resonator method of wave guide discontinuity investigation.

It is a further object of this invention to provide apparatus which will simplify the procedure and improve the accuracy of present cavity resonator methods of wave guide discontinuity investigation.

These and other objects will become apparent upon consideration of the following description in conjunction with the accompanying drawing which is a sectional view of one embodiment of this invention.

The drawing discloses a test oscillator 10 matched to and feeding wave guide 11. Matched load 12 terminates wave guide 11 in its characteristic impedance to prevent reflections and the resulting standing waves therein. Energy is coupled from wave guide 11 into wave guide 13 by input directional coupler 14. Detector 15 is matched to and fed by wave guide 16. Matched load 17 terminates wave guide 16 in its characteristic impedance. Energy is coupled from wave guide 13 into wave guide 16 by output directional coupler 18. Wave guide 13 is terminated in an adjustable short circuit by movable input plunger 19 at one end and by movable terminal plunger 20 at the other end and forms a cavity resonator within the bounds of the two plungers. The discontinuity to be investigated, which may be defined as having a susceptance $jB$, is positioned in wave guide 13 at position 21. To facilitate the examination of different electrical discontinuities at point 21, wave guide 13 can be constructed with a replaceable midsection 13a. This section in the present instance is shown as having an iris mounted therein. As is well known, suitable choke joints may be associated with the different sections of wave guide 13 in order to insure satisfactory propagation of the electromagnetic energy through the assembly. Distance 22 is measured between position 23 of input plunger 19 and position 21 of the discontinuity under investigation. Distance 24 is measured between position 25 of terminal plunger 20 and position 21 of the discontinuity under investigation.

The theory of operation of input directional coupler 14 and that of output directional coupler 18 are identical. In the case of the input directional coupler 14 power passing down wave guide 11 from test oscillator 10 toward matched load 12 is coupled into wave guide 13 through two paths. The dimensions of input directional coupler 14 are such that power traversing path $ace$ arrives at point $e$ in wave guide 13 180° out of phase with power traversing path $abdfe$ and the resulting cancellation results in substantially none of this power being propagated toward input plunger 19. On the other hand power traversing path $acef$ arrives at point $f$ in wave guide 13 in phase with power traversing path $abdf$ and the resulting reinforcement results in substantially all of this power being propagated toward terminal plunger 20. Power in wave guide 13 is coupled to detector 15 in exactly the same manner.

To conduct an investigation of an unknown susceptance, the apparatus is first checked to determine whether it has any discontinuities therein which would affect the measurements on the unknown. This is done by coupling power into the cavity through coupler 14 and adjusting the positions of plungers 19 and 20 to several places where conditions of resonance are fulfilled, as indicated by a maximum output from detector 16. These observations are made by moving the plungers such that the length of the cavity is changed by at least a half wave length of the energy within the guide since the position of a susceptance, if one is present, relative to the position of the standing wave pattern within the cavity, has a marked effect on the measurements, as is readily apparent from a Smith impedance chart. When the sum of distances 22 and 24 is plotted against one of these distances, for example, distance 22, a straight line results if there is no susceptance in the cavity.

Once the foregoing calibration has been made, it need not be repeated, and various discontinuities, which may take the form of a probe, an iris, or similar microwave component, can be investigated with the apparatus. The procedure is to place the discontinuity in the wave guide cavity 13 at point 21, which is located substantially midway between input and output directional couplers 14 and 18. With the discontinuity in place, power is again coupled to the cavity, plungers 19 and 20 are adjusted to various combinations of positions where resonance is obtained as indicated by a maximum output from detector 15. Here again, it is important that the two plungers are moved to such combinations of resonance that the point 21, where the susceptance is located, is effectively shifted at least a half wave length relative to the standing wave pattern within the cavity. Now, if the sum of distances 22 and 24 is plotted against distance 22, a periodic curve having a period corresponding to one-half a guide wave length, will result, the amplitude of the variation thereof being directly proportional to the susceptance of the unknown discontinuity referred to the characteristic admittance of the wave guide forming the cavity. The value of the susceptance can easily be calculated by the following formula:

$$B = 2 \tan \frac{D}{2}$$

where B is the normalized susceptance of the discontinuity, and D is the maximum vertical deviation of the periodic curve obtained as aforesaid, measured in inches. Thus, if the distances 22 and 24 are measured in inches, the angle $$\frac{D}{2}$$

reduces to $$\frac{D\pi}{\lambda_g}$$

where D and $\lambda_g$, the guide wave length, are measured in inches, the resulting angle being in radians. As was previously mentioned, this formula does not give an absolute value of susceptance of the discontinuity, but it is referred to the characteristic admittance of the otherwise smooth wave guide. With the present method and apparatus, discontinuities which produce a standing wave ratio of the order of 1.02 can accurately be measured.

This method is an improvement over previous cavity resonator methods for wave guide discontinuity investigation for the following reasons: (a) the directional couplers have no susceptance that has to be calibrated out of the results, (b) the directional couplers are simple in construction and readily available, (c) the directional couplers have negligible loading effect on the cavity and therefore the resonance is very sharp because the cavity has a high Q, and (d) the input directional coupler 14 reflects negligible impedance into test oscillator 10 so that the frequency of the latter is stable.

The foregoing description applies to one embodiment of this invention. The invention is to be limited only by the appended claims.

What is claimed is:

1. A test instrument for measuring the susceptance of reactive components for wave guide systems comprising, a cavity resonator including an elongated section of wave guide constructed to receive a wave guide component midway the ends thereof, and two movable plungers inserted in opposite ends of said wave guide section for providing adjustable short-circuit terminations therefor, an oscillator, a first directional coupler coupling said oscillator to said wave guide section between one end of said resonator and the point of insertion of said component, a detector, and a second directional coupler coupling said detector to said wave guide section between the other end of said resonator and the point of insertion of said component.

2. A test instrument for measuring the susceptance of reactive components for wave guide systems comprising, in combination, a cavity resonator including an elongated section of wave guide constructed to receive a wave guide component midway the ends thereof, and first and second movable plungers inserted in opposite ends of said section for adjusting the dimensions of said resonator, first and second directional coupler respectively coupled to said wave guide section at opposite sides of the point of insertion of said component, an oscillator coupled to said resonator by said first directional coupler for energizing said resonator, and a detector coupled to said resonator by said second directional coupler for indicating resonance within said resonator, said plungers being movable over a range to vary the electrical length of said resonator by at least a half wave length at the frequency of said oscillator.

3. A test instrument for measuring the susceptance of reactive components for wave guide systems comprising, in combination, a cavity resonator including an elongated section of wave guide having first and second movable plungers inserted in opposite ends thereof for adjusting the dimensions of said resonator, said wave guide section being provided with means midway the ends thereof for receiving a wave guide component, a test oscillator, a first directional coupler connecting said oscillator to said resonator at a point between said first plunger and the point of insertion of said component for propagating waves in said resonator only toward said second plunger, a detector, and a second directional coupler connecting said detector to said resonator for coupling only waves propagated toward said second plunger to said detector for indicating resonance of said resonator.

4. A test instrument for measuring the susceptance of wave guide discontinuities having very small susceptance comprising, in combination, a cavity resonator including an elongated section of wave guide having first and second movable plungers inserted in opposite ends thereof for accurately adjusting the dimensions of said resonator, said wave guide section being provided with means midway the ends thereof for receiving a discontinuity, a test oscillator, means including a first directional coupler connected to said resonator at a point displaced at least a quarter wave length at the frequency of said oscillator from said first plunger for propagating wave energy only toward said second plunger, a detector, and means including a second directional coupler connected to said resonator at a point displaced at least a quarter wave length at the frequency of said oscillator from said second plunger for coupling only waves propagated toward said second plunger to said detector, said plungers being movable over a range to vary the electrical length of said resonator by at least a half wave length at the frequency of said oscillator.

References Cited in the file of this patent

UNITED STATES PATENTS

| Number | Name | Date |
|---|---|---|
| 2,106,768 | Southworth | Feb. 1, 1933 |
| 2,153,728 | Southworth | Apr. 11, 1939 |
| 2,358,462 | Mahren | Sept. 19, 1944 |
| 2,403,289 | Korman | July 2, 1946 |
| 2,404,261 | Whinnery | July 16, 1946 |
| 2,423,390 | Korman | July 1, 1947 |